US 8,964,775 B2

(12) United States Patent
Vermeulen et al.

(10) Patent No.: US 8,964,775 B2
(45) Date of Patent: Feb. 24, 2015

(54) SYSTEM AND METHOD FOR ENCODING A SLOT TABLE FOR A COMMUNICATIONS CONTROLLER

(75) Inventors: Hubertus Gerardus Hendrikus Vermeulen, Eindhoven (NL); Sujan Pandey, Eindhoven (NL); Abhijit Kumar Deb, Eindhoven (NL)

(73) Assignee: NXP B.V., Eindhoven (NL)

( * ) Notice: Subject to any disclaimer, the term of this patent is extended or adjusted under 35 U.S.C. 154(b) by 514 days.

(21) Appl. No.: 13/239,083

(22) Filed: Sep. 21, 2011

(65) Prior Publication Data

US 2013/0070782 A1    Mar. 21, 2013

(51) Int. Cl.
*H04L 12/43* (2006.01)
*H04L 12/40* (2006.01)

(52) U.S. Cl.
CPC . *H04L 12/40026* (2013.01); *H04L 2012/40241* (2013.01)
USPC .......... 370/458; 370/400; 370/442; 370/468; 710/117; 710/124; 710/305

(58) Field of Classification Search
None
See application file for complete search history.

(56) References Cited

U.S. PATENT DOCUMENTS

| | | | | |
|---|---|---|---|---|
| 8,004,993 | B2 * | 8/2011 | Angelow | 370/240 |
| 2005/0254518 | A1 * | 11/2005 | Fujimori | 370/466 |
| 2009/0175290 | A1 | 7/2009 | Newald et al. | |
| 2009/0262649 | A1 * | 10/2009 | Zinke et al. | 370/242 |
| 2010/0014439 | A1 * | 1/2010 | Fuhrmann et al. | 370/252 |
| 2010/0020828 | A1 * | 1/2010 | Angelow | 370/498 |
| 2010/0268910 | A1 * | 10/2010 | Papenhoven | 711/200 |

FOREIGN PATENT DOCUMENTS

WO    2009063347 A1    5/2009

OTHER PUBLICATIONS

P. Milbredt, B. Vermeulen, G. Tabanoglu and M. Lukasiewycz, "Switched FlexRay: Increasing the Effective Bandwidth and Safety of FlexRay Networks", in Proc. IEEE Conf. Emerging Technologies and Factory Automation (ETFA), pp. 1-8, 2010.
FlexRay Communications System Protocol Specification, ver 3.0, FlexRay consortium, Dec. 2009.
FlexRay Communications System Preliminary Central Bus Guardian Specification, ver 2.0.9, FlexRay consortium, [Online], http://www.flexray.com (as of Dec. 22, 2010).
"FlexRay Communications System Protocol Specification, ver 2.1, Rev. A"; FlexRay consortium, 246 pgs.; Dec. 2005.
Extended European Search Report, 12181625.0, Feb. 11, 2013.

* cited by examiner

*Primary Examiner* — Bob Phunkulh

(57) ABSTRACT

Systems and methods for encoding a slot table for a communications controller of a communications network are described. In one embodiment, a method for encoding a slot table for a communications controller of a communications network includes classifying branches of the communications network that are connected to the communications controller into at least one group, where each of the at least one group includes multiple branches, and generating a slot table entry for a time slot for accessing the communications network through the communications controller based on the at least one group. Other embodiments are also described.

14 Claims, 14 Drawing Sheets

| N | SOURCE-BASED ENCODING APPROACH/DESTINATION-BASED ENCODING APPROACH | MATRIX-BASED ENCODING APPROACH | BRANCH CLASSIFICATION WITHOUT SENDER ENCODING APPROACH (TWO BRANCHES PER GROUP) | BRANCH CLASSIFICATION WITH SENDER ENCODING APPROACH (TWO BRANCHES PER GROUP) |
|---|---|---|---|---|
| | $N \times \lceil \log^2(N) \rceil$ | $N^2 - N$ | $N \times \lceil \log^2(N/2) \rceil$ | $N \times \lceil \log^2(N/2) \rceil + N$ |
| 2 | 2 | 2 | 0 | 2 |
| 3 | 6 | 6 | 3 | 6 |
| 4 | 8 | 12 | 4 | 8 |
| 5 | 15 | 20 | 10 | 15 |
| 6 | 18 | 30 | 12 | 18 |
| 7 | 21 | 42 | 14 | 21 |
| 8 | 24 | 56 | 16 | 24 |
| 9 | 36 | 72 | 27 | 36 |
| 10 | 40 | 90 | 30 | 40 |

FIG. 13

SYSTEM AND METHOD FOR ENCODING A SLOT TABLE FOR A COMMUNICATIONS CONTROLLER

Embodiments of the invention relate generally to encoding systems and methods and, more particularly, to systems and methods for encoding slot tables for communications controllers.

A communications controller is a communications hub device that can be used to control communications between communications nodes in an application system. For example, a communications controller can connect communications nodes in an automobile system to control communications between the communications nodes in order to improve the robustness of communications of the automobile system. To control communications between the communications nodes in different time slots, the communications controller can check a slot table that contains encoded communications configuration information of the communications nodes in the time slots.

Systems and methods for encoding a slot table for a communications controller of a communications network are described. In one embodiment, a method for encoding a slot table for a communications controller of a communications network includes classifying branches of the communications network that are connected to the communications controller into at least one group, where each of the at least one group includes multiple branches, and generating a slot table entry for a time slot for accessing the communications network through the communications controller based on the at least one group. Other embodiments are also described.

In an embodiment, a system for encoding a slot table for a communications controller of a communications network includes a branch classification unit configured to classify branches of the communications network that are connected to the communications controller into at least one group, where each of the at least one group includes multiple branches, and a slot table entry generation unit configured to generate a slot table entry for a time slot for accessing the communications network through the communications controller based on the at least one group.

In an embodiment, a method for encoding a slot table for a FlexRay-compatible communications controller of a communications network includes classifying branches of the communications network that are connected to the FlexRay-compatible communications controller into at least one group, where each of the at least one group includes multiple branches, and generating a slot table entry for a time slot for accessing the communications network through the FlexRay-compatible communications controller based on the at least one group.

Other aspects and advantages of embodiments of the present invention will become apparent from the following detailed description, taken in conjunction with the accompanying drawings, depicted by way of example of the principles of the invention.

FIG. 13 shows a comparison table for bits per slot table entry using different encoding approaches.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
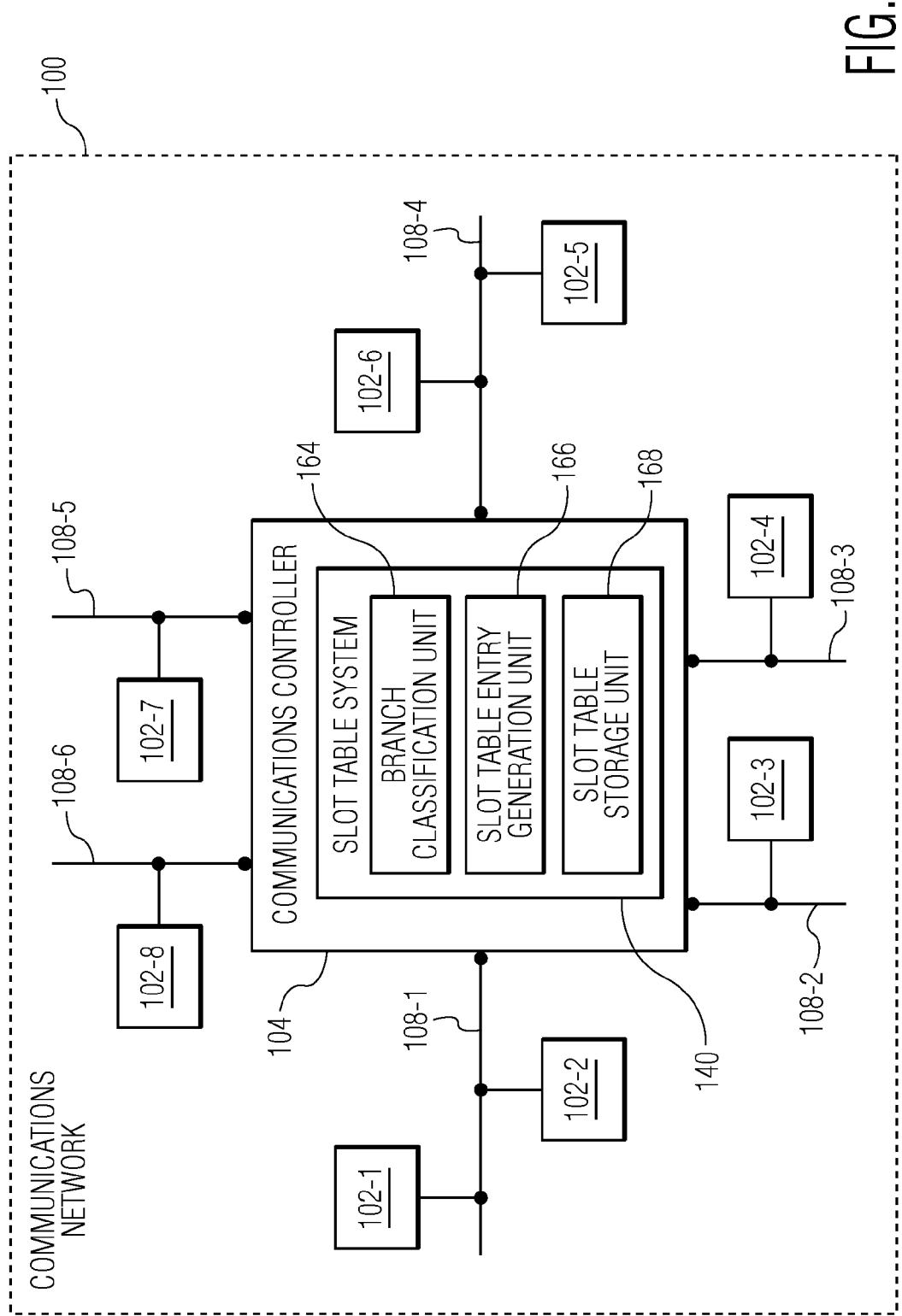
FIG. 1 is a schematic block diagram of a communications network in accordance with an embodiment of the invention.

FIG. 1 is a schematic block diagram of a communications network 100 in accordance with an embodiment of the invention. The communications network can be used for various applications. In an embodiment, the communications network is used for an automotive application. Examples of automotive applications include, without limitation, vehicle dynamics such as braking, suspension, steering, driver assistance, intelligent parking assist, adaptive cruise control, fuel control, traction control, intelligent power assisted steering, lane departure warning, electronic power assisted steering and electronic stability control. For example, the communications network facilitates communications among communications devices, such as electronic controller nodes in an automobile system, which may be located within a single vehicle or distributed across multiple vehicles.

In the embodiment depicted in FIG. 1, the communications network 100 includes communications devices 102-1, 102-2, 102-3, 102-4, 102-5, 102-6, 102-7, 102-8 and a communications controller 104. The communications network is configured to facilitate communications among the communications devices. In an embodiment, the communications network is configured to facilitate critical communications (e.g., safety critical communications) among the communications devices. Although the communications network is shown in FIG. 1 as including eight communications devices, in some other embodiments, the communications network includes more than or less than eight communications devices. Although the communications network is shown in FIG. 1 as including only one communications controller, in some other embodiments, the communications network includes multiple communications controllers.

The communications devices 102-1, 102-2, 102-3, 102-4, 102-5, 102-6, 102-7, 102-8 of the communications network 100 are configured to transmit and receive data. The data transmitted and received by the communications devices can be in any suitable format. In an embodiment, the data transmitted and received are data frames. A data frame may include a header segment, a payload segment used to convey application data, and a trailer segment. In addition to communications, each of the communications devices may be configured to perform an additional function. For example, each of the communications devices may be used to perform an automotive application. In an embodiment, the communications devices are electronic controller nodes in an automobile system. An electronic controller node contains an electronic control unit (ECU), to which sensors and actuators may be connected. The ECU typically collects data from the sensors, runs application software, controls the actuators, and communicates to other electronic controller nodes via the communications network.

The communications controller 104 of the communications network 100 is configured to control communications data transmitted on branches in the communications network. In an embodiment, the communications controller 104 selectively block and selectively forward data received on different data transmission buses or branches in the communications network. In the embodiment depicted in FIG. 1, the communications controller 104 is connected to six branches 108-1, 108-2, 108-3, 108-4, 108-5, 108-6 in the communications network. Specifically, the communications devices 102-1, 102-2 are connected to the branch 108-1, the communications device 102-3 is connected to the branch 108-2, the communications device 102-4 is connected to the branch 108-3, the communications devices 102-5, 102-6 are connected to the branch 108-4, the communications device 102-7 is connected to the branch 108-5 and the communications device 102-8 is connected to the branch 108-6. The six branches 108-1, 108-2, 108-3, 108-4, 108-5, 108-6 are buses in the communications network. The six branches may be any type of physical communications buses. In an embodiment, the six branches are serial communications buses in the communications network. Although the communications controller 104 is shown in FIG. 1 as being connected to six branches, in some other embodiments, the communications controller 104 is connected to more than or less than six branches. In an embodiment, at least one of the communications devices 102-1, 102-2, 102-3, 102-4, 102-5, 102-6, 102-7, 102-8 is directly connected to a branch in the communications network. In other words, at least one of the communications devices 102-1, 102-2, 102-3, 102-4, 102-5, 102-6, 102-7, 102-8 is connected to a branch in the communications network without any intermediate device. In an embodiment, the robustness of safety critical communications of an application system, such as an automobile system, can be improved by connecting communications devices 102-1, 102-2, 102-3, 102-4, 102-5, 102-6, 102-7, 102-8 in the application system to the communications controller 104. For example, the communications controller 104 can block unwanted communications in the automobile system and protect the safety critical communications.

In an embodiment, all of the communications devices 102-1, 102-2, 102-3, 102-4, 102-5, 102-6, 102-7, 102-8 are communications nodes of a FlexRay™ communications system in accordance to the FlexRay™ communications system specifications developed by the FlexRay™ Consortium. A FlexRay™ communications system is a robust, scalable, deterministic and fault-tolerant serial bus system for automotive applications. For example, a FlexRay™ communications system can be used by a car manufacturer to adopt an in-vehicle network (IVN) with increasingly higher data communications speeds to accommodate an increasing number of advanced features in automobiles. In this embodiment, the communications controller 104 is connected to a channel of the FlexRay™ communications system to enable data transfer on the channel and to increase fault tolerance. A channel of the FlexRay™ communications system is a single communications medium, e.g., one network. For example, the FlexRay™ communications system specifications distinguish between two independent, parallel communications media, a channel A and a channel B. The communications controller 104 may be a FlexRay-compatible communications controller, which is designed, developed, manufactured, and/or configured compatibly with or in accordance to the FlexRay™ communications system specifications developed by the FlexRay™ Consortium. When the communications controller 104 is used to protect a channel of a FlexRay™ communications system, some critical faults (e.g., short circuited bus lines or erroneous behavior of a communications node) can be tolerated by the FlexRay™ communications system. The communications controller 104 can support a given number (e.g., 16) of branches in the communications network 100. In an embodiment, a sub-bus or other communications link/device is connected to a branch in the communications network and communications nodes that perform non-critical applications are connected to the sub-bus or the other communications link/device. For example, a gateway or a bridge can be used to connect the CBG 104 to a Local Interconnect Network (LIN) bus, a Controller area network (CAN) bus, or an Ethernet bus, which is connected to external communications devices. The LIN bus is a vehicle bus or a computer networking bus system used within automotive network architectures. The CAN bus is a vehicle bus designed to allow microcontrollers and devices to communicate with each other within a vehicle without a host computer. The number of nodes connected to a sub-bus is not limited by the communications controller 104. The architecture and algorithms of the communications controller 104 may be independent of the number of branches connected to the communications controller 104. In an embodiment, multiple communications controllers are cascaded on one channel of a FlexRay™ system. For example, if a single communications controller cannot connect to a sufficient number of branches for a certain FlexRay™ communications system, multiple communications controllers can be cascaded on one channel of the FlexRay™ system such that a sufficient number of branches are provided.

The communications controller 104 is further configured to store a communications schedule of the communications devices 102-1, 102-2, 102-3, 102-4, 102-5, 102-6, 102-7, 102-8 and configuration parameters. The communications schedule contains information of scheduled data traffic that goes through the communications controller 104. The communications controller 104 controls communications data received on the branches 108-1, 108-2, 108-3, 108-4, 108-5, 108-6 connected to the communications controller 104 based on the communications schedule and/or the configuration parameters. In an embodiment, communications controller 104 selectively blocks and selectively forwards data received on the branches 108-1, 108-2, 108-3, 108-4, 108-5, 108-6 connected to the communications controller 104 based on the communications schedule and/or the configuration parameters. The communications controller 104 may not store the complete communications schedule of the communications network 100. The communications controller 104 at least stores branch level communications schedule of data communications that goes through the communications controller 104. However, the communications controller 104 may also store more information, e.g., node level communications schedule, of data communications that goes through the communications controller 104. In an embodiment, the communications controller 104 has information to protect data (e.g., a data frame or data frames) relevant to critical functions and to start up and maintain communications. In an embodiment, if only a subset of the communications devices and messages are used to fulfill a critical function, only the schedule of the subset of the communications devices and messages is stored in the communications controller and only the slot/branch combinations of the subset of the communications devices and messages are protected. A time slot may be a slot in a static segment of a FlexRay-compatible communications cycle or a mini-slot in a dynamic segment of a FlexRay-compatible communications cycle. As a result, a change in a communications device performing a non-critical function will not lead to a change in the communications schedule stored in the communications controller 104.

In an embodiment, the communications controller 104 is configured to decode data (e.g., a data frame or data frames). The communications controller 104 can also filter received data frames. Examples of filtering functions that can be performed by the communications controller includes, without limitation, semantic filtering and Byzantine (SOS) filtering. By filtering received data frames, the communications controller 104 operates to ensure that certain errors on one branch will not propagate to other branches. Because the communications controller 104 is separated from the communications devices 102-1, 102-2, 102-3, 102-4, 102-5, 102-6, 102-7, 102-8, errors in the communications devices will not harm the communications controller. Data such as a data frame that is identified as faulty by the communications controller 104 will be invalidated in such a way that all of the communications devices will detect the data as being faulty. The communications controller 104 can prevent the formation of cliques on one channel during startup and normal operation by not-forwarding or invalidating frames which are identified as faulty (e.g., with wrong frame ID or cycle count).

The communications controller 104 can protect the startup of a FlexRay™ communications system in the presence of faults. In addition, the communications controller 104 can significantly enhance the fault tolerance of the FlexRay™ system especially during startup. For example, the communications controller 104 can limit the bandwidth assigned to a certain communications device or a branch connected to the communications controller 104.

Figure 2:
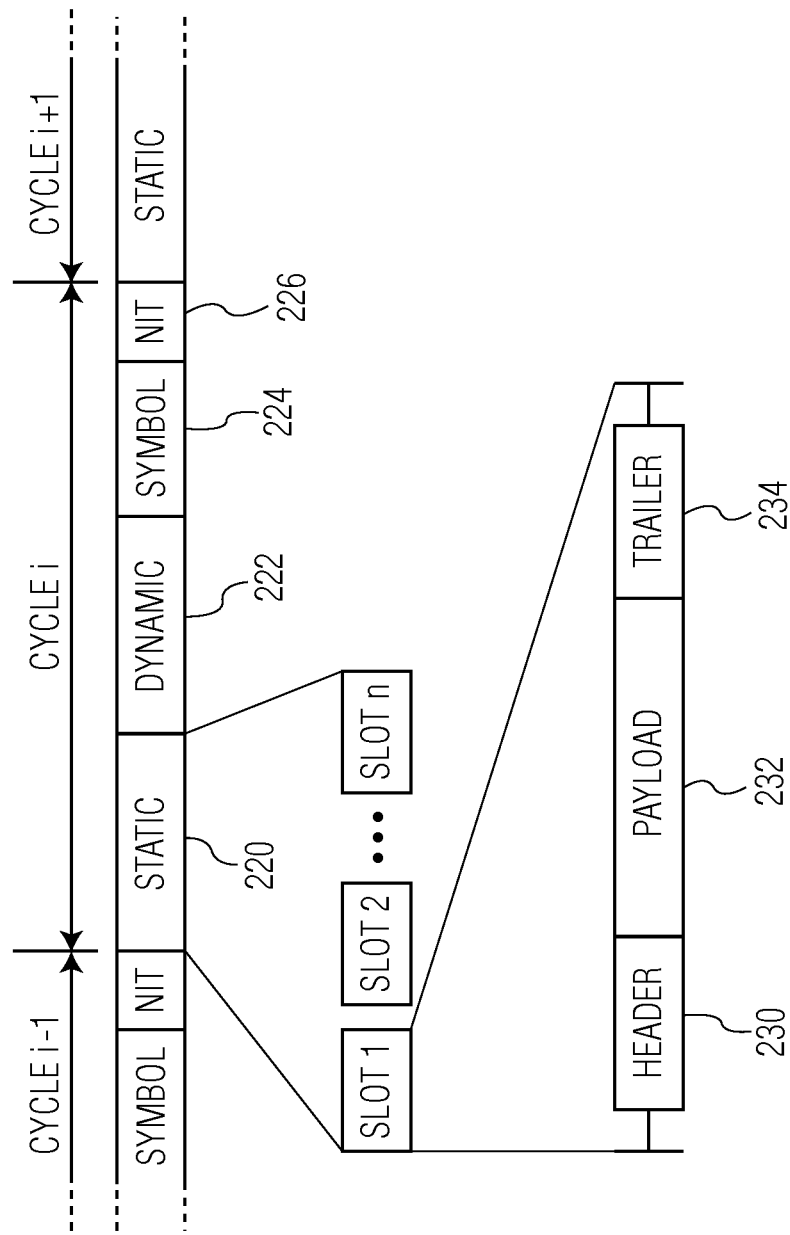
FIG. 2 illustrates an exemplary access diagram of the communications network depicted in FIG. 1.

In an embodiment, access to the communications network 100 is partitioned, divided, or grouped into consecutive communications cycles. FIG. 2 illustrates an exemplary access diagram of the communications network depicted in FIG. 1. As shown in FIG. 2, the communications network is accessed through at least three communications cycles, which include cycle "i−1," cycle "i" and cycle "i+1," where i is an integer that is larger than 0. Each cycle includes a static segment, an optional dynamic segment, an optional symbol window and a network idle time (NIT) interval. The static segment is divided into static slots and the dynamic segment is divided into mini-slots. In the embodiment depicted in FIG. 2, cycle i includes a static segment 220, a dynamic segment 222, a symbol window 224 and a NIT interval 226. In an embodiment, the static segment 220 is used to send critical, real-time data, and is divided into static slots, in which the electronic control units (ECUs) can send a frame on the bus. In an embodiment, the dynamic segment 222 enables event-triggered communication. The lengths of the mini-slots in the dynamic segment depend on whether or not an ECU sends data. In an embodiment, the symbol window 224 is used to transmit special symbols, for example, special symbols to start up a FlexRay cluster. In an embodiment, the NIT interval 226 is used by the communications devices 102-1, 102-2, 102-3, 102-4, 102-5, 102-6, 102-7, 102-8 to allow them to correct their local time bases in order to stay synchronized to each other. The static segment 220 is divided into slots 1 . . . n, where n is an integer that is larger than two. Each of the slots 1 . . . n is used to transmit a data frame, which includes a header segment, a payload segment used to convey application data and a trailer segment. For example, slot 1 is used to transmit a data frame that includes a header segment 230, a payload segment 232 and a trailer segment 234. In an embodiment, all slots of the static segment have identical size. A single communications device may use more than one slot.

In the embodiment depicted in FIG. 1, the communications controller 104 includes a slot table system 140, which includes a branch classification unit 164, a slot table entry generation unit 166 and a slot table storage unit 168. The branch classification unit 164 is configured to classify, group or partition branches 108-1, 108-2, 108-3, 108-4, 108-5, 108-6 of the communications network 100 that are connected to the communications controller 104 into one or more groups or partitions. Each group or partition includes multiple branches. The slot table entry generation unit 166 is configured to generate a slot table entry for at least one time slot for accessing the communications network through the communications controller 104 based on the group or groups. In an embodiment, the slot table entry generation unit 166 is configured to generate a slot table entry for each time slot for accessing the communications network through the communications controller 104 based on the group or groups. The classification of the branches of the communications network may not be fixed. In an embodiment, the classification of the branches of the communications network for one time slot is different from the classification of the branches of the communications network for another time slot. A time slot for accessing the communications network through the communications controller 104 may be a slot of a static segment of a communications cycle or a mini-slot of a dynamic segment of a communications cycle. The slot table storage unit 168 is configured to store at least one slot table that includes one or more slot table entries. The slot table storage unit 168 may be a semiconductor memory or a solid state memory. In an embodiment, the slot table storage unit 168 is implemented as a non-volatile memory such as a read-only memory (ROM). In an exemplary operation, the communications controller 104 looks up a slot table entry stored in the slot table storage unit 168 to determine what operation to perform in each slot/mini-slot of each static/dynamic segment of a communications cycle. Although the branch classification unit 164, the slot table entry generation unit 166 and the slot table storage unit 168 are shown in FIG. 1 as separate units, in some other embodiments, at least two of the branch classification unit 164, the slot table entry generation unit 166 and the slot table storage unit 168 are integrated into a single unit. In addition, although the branch classification unit 164, the slot table entry generation unit 166 and the slot table storage unit 168 are shown in FIG. 1 as being located inside the communications controller 104 and being a part of the communications controller 104, in some other embodiments, at least one of the branch classification unit 164, the slot table entry generation unit 166 and the slot table storage unit 168 is located external to the communications controller 104 and is not a part of the communications controller 104.

Figure 3:
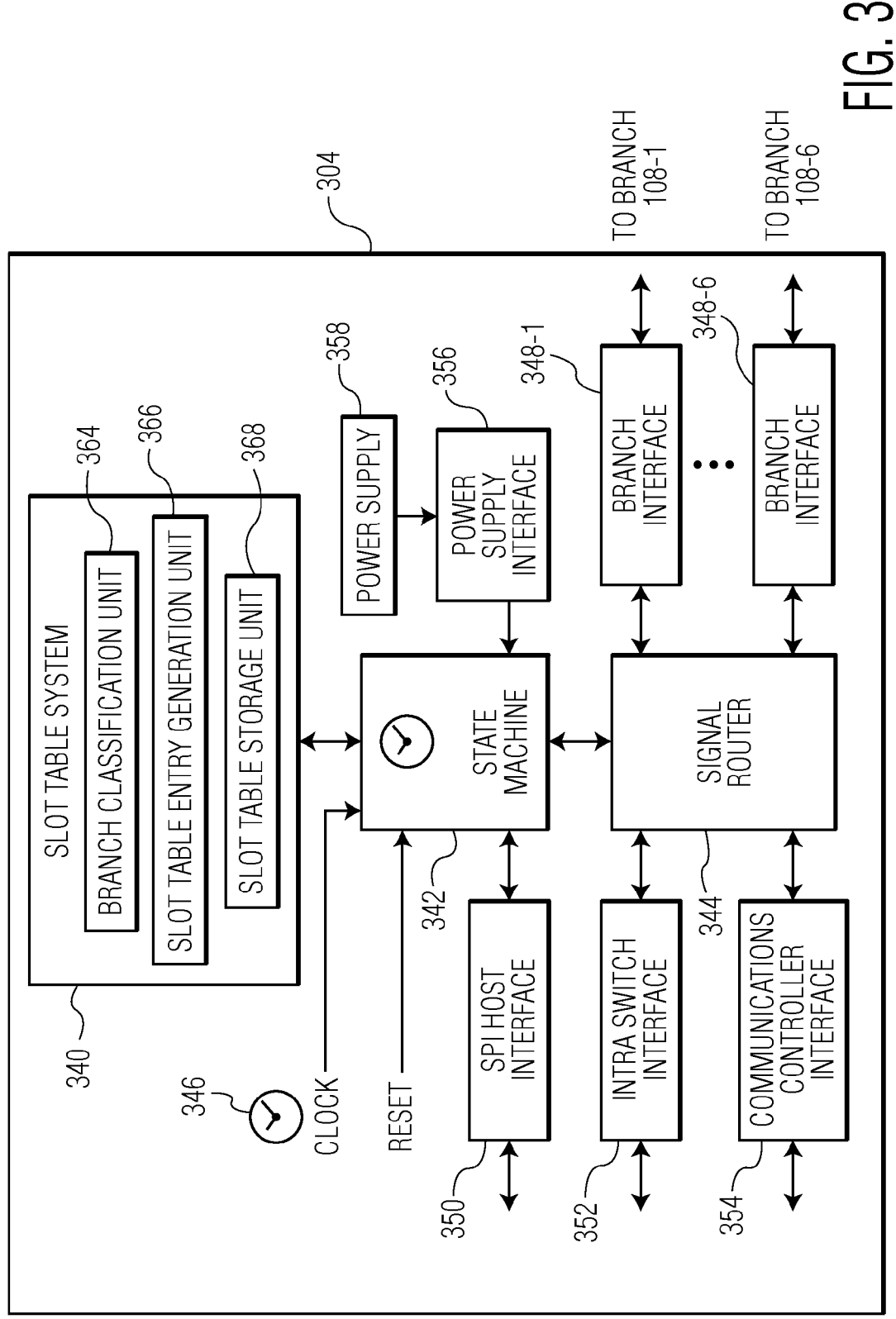
FIG. 3 depicts an embodiment of the communications controller depicted in FIG. 1 that is implemented as a switch.

The communications controller 104 may be implemented as a switch (e.g., a FlexRay™ switch) or a CBG (e.g., a FlexRay™ CBG), which are described below. Compared to a CBG, a switch may not need to know from which branch 108-1, 108-2, 108-3, 108-4, 108-5, or 108-6 data (e.g., a data frame or data frames) is received. FIG. 3 depicts an embodiment of the communications controller 104 depicted in FIG. 1 that is implemented as a switch 304. The switch may be a FlexRay-compatible switch, which is designed, developed, manufactured, and/or configured compatibly with or in accordance to the FlexRay™ communications system specifications developed by the FlexRay™ Consortium. In an embodiment, the switch is similar to or the same as the FlexRay™ switch described in P. Milbredt, B. Vermeulen, G. Tabanoglu and M. Lukasiewycz, "Switched FlexRay: Increasing the effective bandwidth and safety of FlexRay networks," in Proceeding of IEEE Conference Emerging Technologies and Factory Automation (ETFA), pages 1-8, 2010. The switch is one of possible implementations of the communications controller 104. However, the communications controller 104 can be implemented differently from the switch depicted in FIG. 3. The invention is not restricted to the particular implementation of the switch depicted in FIG. 3.

In the embodiment depicted in FIG. 3, the switch 304 includes a slot table system 340, a state machine 342, a signal router 344, a clock 346, branch interfaces 348-1 ... 348-6, a Serial Peripheral Interface (SPI) host interface 350, an intra switch interface 352, a communications controller interface 354, a power supply interface 356 and a power supply 358. Although the slot table system 340, the clock and the power supply are shown in FIG. 3 as being parts of the switch, in some other embodiments, at least one of the slot table system 340, the clock and the power supply is not a part of the switch.

In the embodiment depicted in FIG. 3, the slot table system 340 performs functions similar to or same as the slot table system 140 depicted in FIG. 1. Specifically, the slot table system 340 is configured to generate and store a slot table, which contains data switching information for the branches 108-1, 108-2, 108-3, 108-4, 108-5, 108-6 connected to the switch 304. In the embodiment depicted in FIG. 3, the slot table system 340 includes a branch classification unit 364, a slot table entry generation unit 366 and a slot table storage unit 368, which perform functions similar to or same as the branch classification unit 164, the slot table entry generation unit 166 and the slot table storage unit 168 depicted in FIG. 1, respectively. Although the branch classification unit 364, the slot table entry generation unit 366 and the slot table storage unit 368 are shown in FIG. 3 as separate units, in some other embodiments, at least two of the branch classification unit 364, the slot table entry generation unit 366 and the slot table storage unit 368 are integrated into a single unit. In addition, although the branch classification unit 364, the slot table entry generation unit 366 and the slot table storage unit 368 are shown in FIG. 3 as being located inside the switch and being a part of the switch, in some other embodiments, at least one of the branch classification unit 364, the slot table entry generation unit 366 and the slot table storage unit 368 is located external to the switch and is not a part of the switch.

The state machine 342 is configured to keep track of the time slots to determine the current time slot of the communications network 100. In the embodiment depicted in FIG. 3, the state machine 342 configures the signal router 344 based on the data switching information in the slot table stored in the slot table storage unit 368. In an embodiment, for each time slot, the state machine 342 retrieves a slot table entry stored at the corresponding location in the slot table system 340 and uses data in the slot table entry to control the data forwarding in the time slot. The signal router is configured to perform data switching between the branches 108-1, 108-2, 108-3, 108-4, 108-5, 108-6 connected to the switch 304.

The clock 346 is configured to provide one or more clock signals to the state machine 342. The branch interfaces 348-1 ... 348-6 are connected to the branches 108-1, 108-2, 108-3, 108-4, 108-5, 108-6, respectively. The branch interfaces are configured to receive data from one or more of the branches 108-1, 108-2, 108-3, 108-4, 108-5, 108-6 connected to the switch 304 and to send the data to one or more of the branches 108-1, 108-2, 108-3, 108-4, 108-5, 108-6.

The SPI host interface 350 can be used by a local host to configure the switch 304. The intra switch interface 352 is configured to cascade switches to support more branches than a single switch can support. The communications controller interface 354 is configured to allow a local host to communicate to the branches 108-1, 108-2, 108-3, 108-4, 108-5, 108-6 through the switch.

The power supply interface 356 is connected to the power supply 358 and the state machine 342. The power supply interface acts as an interface between the power supply and the switch 304. The power supply is configured to provide power to the switch.

In an embodiment, the signal router 344 forwards data from one or more branches 108-1, 108-2, 108-3, 108-4, 108-5, or 108-6 connected to the switch 304 to one or more other branches 108-1, 108-2, 108-3, 108-4, 108-5, or 108-6 connected to the switch under control of the internal state machine 342. For each slot, the state machine retrieves a slot table entry stored at the corresponding location in the slot table storage unit 368 and uses data in the slot table entry to configure the signal router to control the data forwarding in the slot.

Figure 4:
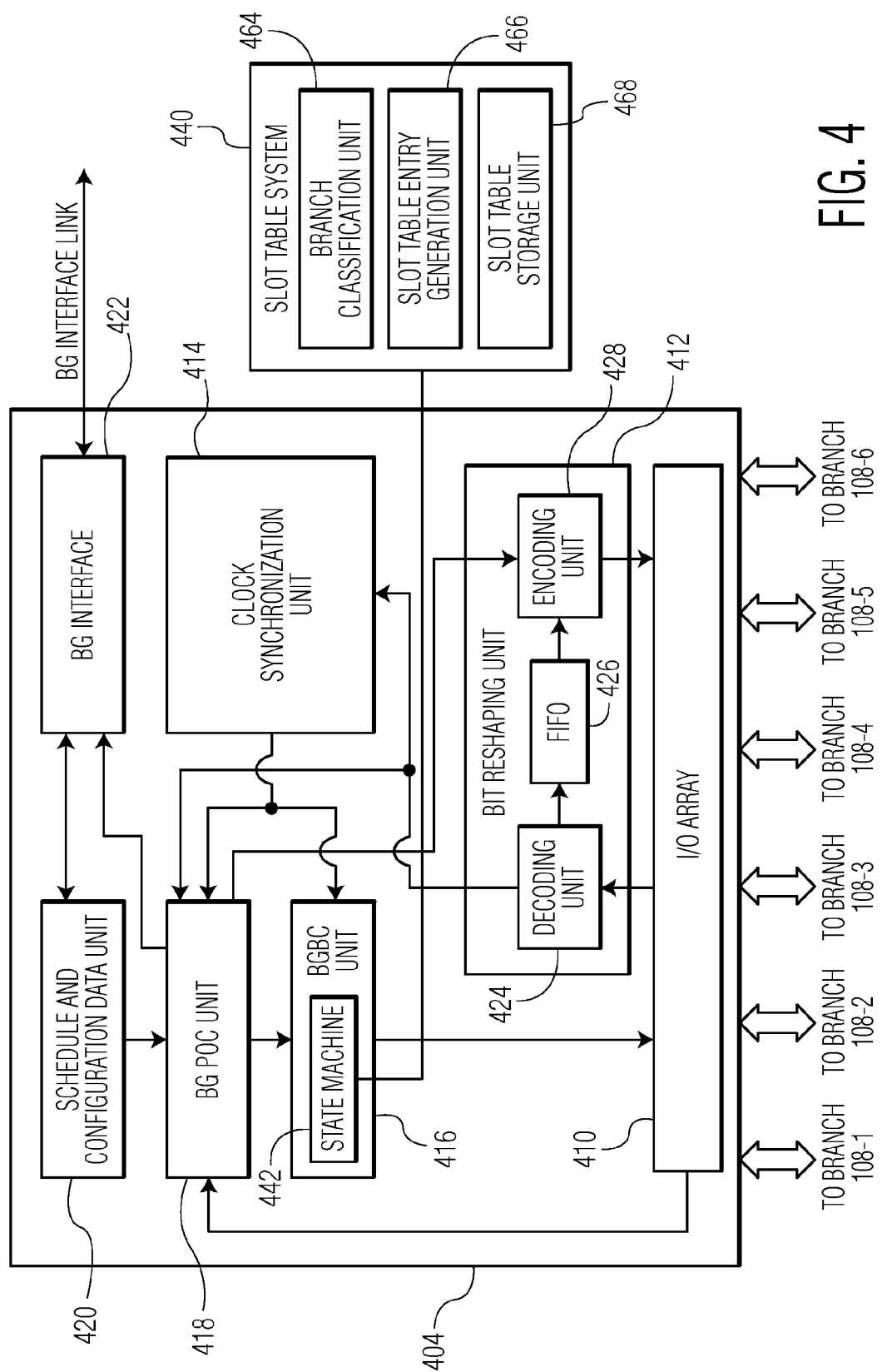
FIG. 4 depicts an embodiment of the communications controller depicted in FIG. 1 that is implemented as a central bus guardian (CBG).

FIG. 4 depicts an embodiment of the communications controller 104 depicted in FIG. 1 that is implemented as a CBG 404. The CBG may be a FlexRay-compatible CBG, which is designed, developed, manufactured, and/or configured compatibly with or in accordance to the FlexRay™ communications system specifications developed by the FlexRay™ Consortium. In the embodiment depicted in FIG. 4, the CBG includes an input/output (I/O) array 410, a bit reshaping unit 412, a clock synchronization unit 414, a bus guardian branch control (BGBC) unit 416, a bus guardian (BG) Protocol Operation Control (BG POC) unit 418, a schedule and configuration data unit 420 and a BG Interface 422. The CBG is one of possible implementations of the communications controller 104. However, the communications controller 104 can be implemented differently from the CBG depicted in FIG. 4.

The invention is not restricted to the particular implementation of the CBG depicted in FIG. 4.

The I/O array 410 of the CBG 404 is configured to connect to all of the branches 108-1, 108-2, 108-3, 108-4, 108-5, 108-6 connected to the CBG. In an embodiment, incoming data (e.g., an incoming data frame) received by the I/O array from one branch connected to the CBG is forwarded to the bit reshaping unit 412 before the incoming data is forwarded to the other branches connected to the CBG. The I/O array allows only one branch to receive a communications element at a given point in time. If the CBG allows race arbitration in which the first incoming data frame from one branch will be delivered to all other branches, during the transmission of the first incoming data frame, no data frame from another branch can be received by the I/O array.

The bit reshaping unit 412 of the CBG 404 operates to ensure that, independent of the input signal quality, the output signal delivers the same decoding results for all receiving devices. If the decoded data (e.g., a decoded data frame) is correct, all non-faulty communications devices will receive the correct data. If the decoded data is incorrect, all non-faulty communications devices will receive the incorrect data. The output stream of the bit reshaping unit is generated using the clock of the CBG.

In the embodiment depicted in FIG. 4, the bit reshaping unit 412 includes a decoding unit 424, a First in First out (FIFO) buffer 426 and an encoding unit 428. The decoding unit of the bit reshaping unit is configured to decode received data (e.g., a received data frame) from the I/O array 410 and to deliver the data and relevant timing and status information to the clock synchronization unit 414 and the BG POC unit 418. The status information contains the information on whether data was received, whether a startup or a sync data frame was received, and error information. In an embodiment, the decoding unit verifies the conformance of an incoming bit-stream to the coding rules and the general rules of communications elements. If the decoding unit finds an error in the incoming bitstream, the BG POC unit or other component of the CBG may stop the current relay process and change (e.g., truncate or enlarge) the bit stream to invalidate the bitstream.

The FIFO buffer 426 of the bit reshaping unit 412 is configured to store data (e.g., data bits) that is transferred from the decoding unit 424 to the encoding unit 428. Because the clock of a data sender and the clock of the CBG 404 may run at slightly different speeds, the number of bits stored within the FIFO buffer can increase or decrease during data transmission (e.g., transmission of a data frame). The size of the FIFO buffer typically has to be twice the size that would be required for the nominal delay of the bit reshaping unit due to the possible increase or decrease of stored bits during forwarding of a data frame.

The encoding unit 428 of the bit reshaping unit 412 is configured to encode data received from the BG POC unit 418 and to deliver the encoded data (e.g., bitstream or symbols) to the I/O array 410. In an embodiment, the BG POC unit overrules data and forces the encoding unit to output an invalidated communications element. Due to possible clock deviations between a data sender and the CBG, the bit reshaping unit introduces an additional propagation delay, depending on maximal frame length and maximal relative clock deviation. The propagation delay can be reduced and the FIFO buffer minimized by allowing the encoding unit to compensate the clock speed difference, for example, by slightly varying the length of the high-bit in the byte start sequences of the data frame.

The clock synchronization unit 414 of the CBG 404 is configured to synchronize the CBG to the global time. Errors of the clock synchronization process are signaled from the clock synchronization unit to the BG POC unit 418. In an embodiment, the clock synchronization unit is basically identical to a clock synchronization unit in one of the communications devices 102-1, 102-2, 102-3, 102-4, 102-5, 102-6, 102-7, 102-8.

The BGBC unit 416 of the CBG 404 is configured to enforce a correct transmission schedule by opening the correct branches connected to the CBG for transmission at the correct time. In an embodiment, the BGBC unit operates such that the CBG behaves as an inactive device in which all of the branches connected to the CBG are used for input and none of the branches is used to output. In another embodiment, the BGBC unit operates to forward data received from one of the branches to all other branches.

In the embodiment depicted in FIG. 4, a slot table system 440 is located external to the CBG 404. The slot table system 440 performs functions similar to or same as the slot table system 140 depicted in FIG. 1. Specifically, the slot table system 440 is configured to store data switching information for the branches 108-1, 108-2, 108-3, 108-4, 108-5, 108-6 connected to the CBG. In the embodiment depicted in FIG. 4, the slot table system 440 includes a branch classification unit 464, a slot table entry generation unit 466 and a slot table storage unit 468, which perform functions similar to or same as the branch classification unit 164, the slot table entry generation unit 166 and the slot table storage unit 168 depicted in FIG. 1, respectively. Although the branch classification unit 464, the slot table entry generation unit 466 and the slot table storage unit 468 are shown in FIG. 4 as separate units, in some other embodiments, at least two of the branch classification unit 464, the slot table entry generation unit 466 and the slot table storage unit 468 are integrated into a single unit. In addition, although the branch classification unit 464, the slot table entry generation unit 466 and the slot table storage unit 468 are shown in FIG. 4 as being located outside the CBG and not being a part of the CBG, in some other embodiments, at least one of the branch classification unit 464, the slot table entry generation unit 466 and the slot table storage unit 468 is located inside the CBG and is a part of the CBG.

In the embodiment depicted in FIG. 4, the BGBC unit 416 includes a state machine 442 that performs functions similar to or same as the state machine 342 depicted in FIG. 3. Specifically, the state machine 442 is configured to keep track of in which time slot the communications network 100 is and to perform data switching between the branches 108-1, 108-2, 108-3, 108-4, 108-5, 108-6 connected to the CBG 404 according to data switching information stored in the slot table system 440. In an embodiment, for each time slot, the state machine 442 retrieves a slot table entry stored at the corresponding location in the slot table storage unit 468 and uses data in the slot table entry to control the data forwarding in the time slot.

The BG POC unit 418 of the CBG 404 is configured to handle the different states (e.g., startup and normal operation, etc.) of the CBG and the transitions between the different states. In addition, the BG POC unit is also configured to enforce the schedule by sending the appropriate commands to the BGBC unit 416. All detected errors are stored by the BG POC unit and are made available to external devices through the BG Interface 422. The BG POC unit may have filtering capability. For example, if the decoding unit 424 finds an error in the incoming bitstream, the BG POC unit may stop the current relay process and truncate (or enlarge) the communications element to invalidate the communications element.

The schedule and configuration data unit 420 of the CBG 404 is configured to store the communications schedule (or at least the parts that need to be protected) and all necessary configuration data and to makes the stored information available to the BG POC unit 418. The integrity of the communications schedule and configuration data can be protected by an error-detecting code (e.g., a CRC) that is checked periodically. Mismatches between the data and tan error-detecting code cause the CBG to transit into a state in which no communications elements are forwarded.

The BG Interface 422 of the CBG 404 is an optional connection device that allows an external computing unit (e.g., a central processing unit (CPU)) to perform certain operations involving the CBG. In an embodiment, the BG Interface is connected to a BG interface link and provides the possibility for an external device to update the communications schedule and configuration data of the CBG. The BG interface also allows error messages, status information and configuration data to be read out of the CBG. In an embodiment, the BG Interface 222 is connected to a gateway via a BG interface link and the gateway is connected to an external network.

Information stored in the slot table systems 140, 340, 440 can be encoded in various formats that can be used by the communications controller 104, such as the switch 304 and the CBG 404. For example, for each of the branches 108-1, 108-2, 108-3, 108-4, 108-5, 108-6, a slot table entry may specify from which source branch a particular branch can receive data, which is referred to herein as the source-based encoding approach. If this encoding approach is used, because six branches 108-1, 108-2, 108-3, 108-4, 108-5, 108-6 are connected to the communications controller 104, such as the switch 304 or the CBG 404, for each branch connected to the communications controller, at least three bits are needed to specify a source branch. Therefore, for each slot table entry, eighteen bits are needed to specify source branches for the branches 108-1, 108-2, 108-3, 108-4, 108-5, 108-6. One of the drawbacks of the source-based encoding approach is the lack of backward compatibility with FlexRay™ active star devices. For example, it may be desirable to specify in a slot table entry multiple source branches from which a particular branch can receive data. Therefore, multiple source branches must be specified for a particular branch. However, the source-based encoding approach does not allow specifying multiple source branches for a particular branch.

In another example, for each of the branches 108-1, 108-2, 108-3, 108-4, 108-5, 108-6, a slot table entry specifies to which destination branch a particular branch can send data, which is referred to herein as the destination-based encoding approach. If this encoding approach is used, because six branches 108-1, 108-2, 108-3, 108-4, 108-5, 108-6 are connected to the communications controller 104, such as the switch 304 or the CBG 404, for each branch connected to the communications controller 104, at least three bits are needed to specify a destination branch. Therefore, for each slot table entry, eighteen bits are needed to specify destination branches for the branches 108-1, 108-2, 108-3, 108-4, 108-5, 108-6. Similar to the source-based encoding approach, one of the drawbacks of the destination-based encoding approach is the lack of backward compatibility with FlexRay™ active star devices. Sometimes, it may be desirable to specify multiple destination branches to which a particular branch can send data. For example, FlexRay™ synchronization frames need to be sent to all of the branches 108-1, 108-2, 108-3, 108-4, 108-5, 108-6 to allow all communications nodes in a network to synchronize their local time bases to the global cluster time base. Although it is possible to use a reserved encoding combination to specify multiple destination branches for a particular branch in the same slot, a reserved encoding combination still does not allow other groupings of the branches to be specified to maximize the available bandwidth.

In yet another example, a matrix may be used for a slot table entry in a slot table to specify communications between the branches 108-1, 108-2, 108-3, 108-4, 108-5, 108-6 in a time slot. Specifying communications between the branches 108-1, 108-2, 108-3, 108-4, 108-5, 108-6 in a slot table entry is referred to as the matrix-based encoding approach. The diagonal of the matrix consists of zeros only because a branch does not need to be specified as being connected to itself. For each slot table entry, thirty bits are needed to specify the communications between the branches 108-1, 108-2, 108-3, 108-4, 108-5, 108-6 in each time slot. One of the drawbacks of the matrix-based encoding approach is the large number of bits required to encode a slot table entry.

In the embodiments depicted in FIGS. 1, 3 and 4, the branches 108-1, 108-2, 108-3, 108-4, 108-5, 108-6 connected to the communications controller 104, such as the switch 304 or the CBG 404, are classified, partitioned, divided or grouped into at least one group, partition or division by the branch classification unit 164, 364 or 464, where each of the at least one group, partition or division includes multiple branches, and entries in the slot table system 140 are encoded based on the at least one group, partition or division by the slot table entry generation unit 166, 366 or 466. Classifying branches of a communications network that are connected to a communications controller into one or more groups and generating a slot table entry for a time slot for accessing the communications network through the communications controller based on the groups is referred to as the branch classification encoding approach. The branch classification encoding approach can be used by various embodiments of the communications controller 104. For example, the branch classification encoding approach can be used by the switch 304 and the CBG 404.

In the branch classification encoding approach, a communications device connected to a branch in a group can send and/or receive data from a communications device connected to another branch in the same group through the communications controller 104. A communications device connected to a branch in a group cannot send or receive data from a communications device connected to a branch in a different group through the communications controller 104. In an embodiment, the slot table entry generation unit 166, 366 or 466 is configured to generate the slot table entry that, for each of the branches 108-1, 108-2, 108-3, 108-4, 108-5, 108-6 of the communications network 100 that are connected to the communications controller 104, 304, or 404, specifies into which of the at least one group a particular branch is classified so that the communications controller only allows communications devices connected to branches in each of the at least one group to communicate with each other through the communications controller in the time slot In addition, in the branch classification encoding approach, the classification of the branches 108-1, 108-2, 108-3, 108-4, 108-5, 108-6 of the communications network 100 may not be fixed. For example, the classification of the branches of the communications network for one time slot may be different from the classification of the branches of the communications network for another time slot. In an embodiment, the branch classification unit 164, 364 or 464 is configured to classify the branches of the communications network that are connected to the communications controller 104, 304, or 404 into one or more groups and the slot table entry generation unit 166, 366 or 466 is further configured to generate a second slot table entry for a second time slot for accessing the communications network through the communications controller based on the one or more groups. The one or more groups may be different from the at least one group.

Compared with the source-based encoding approach, the destination-based encoding approach and the matrix-based encoding approach, the branch classification encoding approach can use the same number bits or fewer bits to encode the slot table. Specifically, because each group includes multiple branches, the number of group/groups is always smaller than the number of branches 108-1, 108-2, 108-3, 108-4, 108-5, 108-6 in the communications network 100 in the branch classification encoding approach. Because the number of group/groups is always smaller than the number of branches in the communications network 100 in the branch classification encoding approach, compared with the source-based encoding approach, the destination-based encoding approach and the matrix-based encoding approach, the branch classification encoding approach can use the same number bits or fewer bits to encode the slot table. Because fewer bits can be used to encode the slot table, the slot table can be implemented using less memory, which results in lower cost. In addition to the reduction of the slot table encoding bit size, the branch classification encoding approach supports multiple senders and multiple receivers. For example, multiple branches can be placed in the same group. As a consequence, specifying only into which group a particular branch is classified in slot table entries can support backward compatibility with a FlexRay™ active star device and allow parallel communications on different groups in different time slots to increase the overall bandwidth. The branch classification encoding approach can be used by various embodiments of the communications controller 104. For example, the branch classification encoding approach can be used by the switch 304 and the CBG 404.

In an exemplary operation of the communications controller 104, such as the switch 304 or the CBG 404 under the branch classification encoding approach, in a time slot, the communications controller 104 checks a slot table entry of the time slot to selectively block and selectively forward data received on branches 108-1, 108-2, 108-3, 108-4, 108-5, 108-6 connected to the communications controller 104. Upon receiving data from a sender communications device 102-1, 102-2, 102-3, 102-4, 102-5, 102-6, 102-7 or 102-8, the communications controller 104 checks the destination communications device 102-1, 102-2, 102-3, 102-4, 102-5, 102-6, 102-7 or 102-8 of the received data. If the sender communications device and the destination communications device are connected to branches that are classified into different groups, the communications controller blocks the received data from being delivered to the destination communications device. If the sender communications device and the destination communications device are connected to branches that are classified into the same group, the communications controller may forward the received data to the destination communications device.

In an embodiment, for each of the branches 108-1, 108-2, 108-3, 108-4, 108-5, 108-6 connected to the communications controller 104, such as the switch 304 or the CBG 404, a slot table entry only specifies into which group a particular branch is classified. For example, the slot table entry generation unit 166, 366 or 466 is configured to generate the slot table entry that, for each of the branches 108-1, 108-2, 108-3, 108-4, 108-5, 108-6 of the communications network 100 that are connected to the communications controller 104, 304 or 404, only specifies into which of the at least one group a particular branch is classified. Only specifying the classified group for each branch is referred to as the branch classification without sender encoding approach. In the branch classification without sender encoding approach, a slot table entry of each group of the branches does not distinguish between a source branch and a destination branch. Some examples of slot tables encoded in the branch classification without sender encoding approach are described below with respect to FIGS. 5-7.

Figure 5:
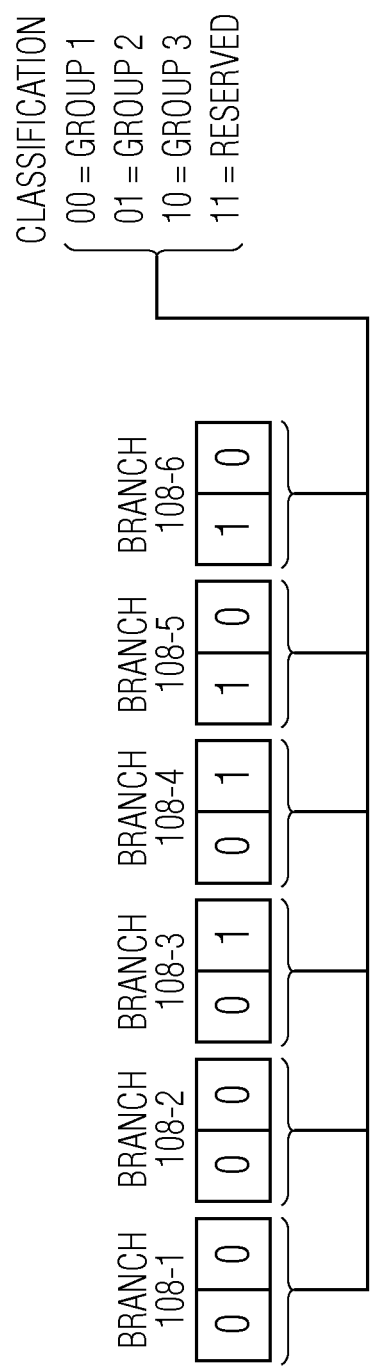
FIGS. 5-12 depict some exemplary slot tables for the communications network depicted in FIG. 1 encoded in accordance with embodiments of the invention.

In the example depicted in FIG. 5, the branches 108-1, 108-2, 108-3, 108-4, 108-5, 108-6 connected to the communications controller 104, such as the switch 304 or the CBG 404, are classified into three groups that are represented using two bits. Each of the three groups includes two branches. Specifically, the two-bit code "00" is used to represent group #1, the two-bit code "01" is used to represent group #2, the two-bit code "10" is used to represent group #3, and the two-bit code "11" is reserved. A slot table entry only specifies for each branch connected to the communications controller 104 into which group the branch is classified. In the example depicted in FIG. 5, the code "00" is assigned to the branches 108-1, 108-2, representing that the branches 108-1, 108-2 are classified into group #1 in a slot table entry. In addition, the code "01" is assigned to the branches 108-3, 108-4, representing that the branches 108-3, 108-4 are classified into group #2 in the slot table entry. Furthermore, the code "10" is assigned to the branches 108-5, 108-6, representing that the branches 108-5, 108-6 are classified into group #3 in the slot table entry. For each slot table entry, twelve bits are needed to specify groups of all of the branches connected to the communications controller 104.

Figure 6:
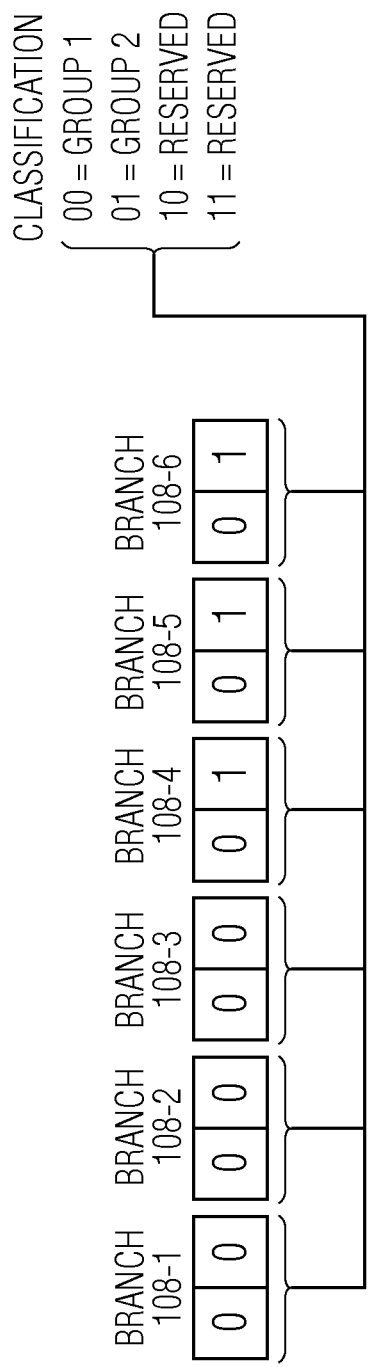

In the example depicted in FIG. 6, the branches 108-1, 108-2, 108-3, 108-4, 108-5, 108-6 connected to the communications controller 104, such as the switch 304 or the CBG 404, are classified into two groups that are represented using two bits. Each of the two groups includes three branches. Specifically, the two-bit code "00" is used to represent group #1, the two-bit code "01" is used to represent group #2, and "10" and "11" are reserved. A slot table entry only specifies for each branch connected to the communications controller 104 into which group the branch is classified. For each branch connected to the communications controller 104, two bits are needed to specify a group. In the example depicted in FIG. 6, the code "00" is assigned to the branches 108-1, 108-2, 108-3 in a slot table entry, representing that the branches 108-1, 108-2, 108-3 are classified into group #1. In addition, the code "01" is assigned to the branches 108-4, 108-5, 108-6 in the slot table entry, representing that the branches 108-4, 108-5, 108-6 are classified into group #2. For each slot table entry, twelve bits are needed to specify groups of all of the branches connected to the communications controller 104.

Figure 7:
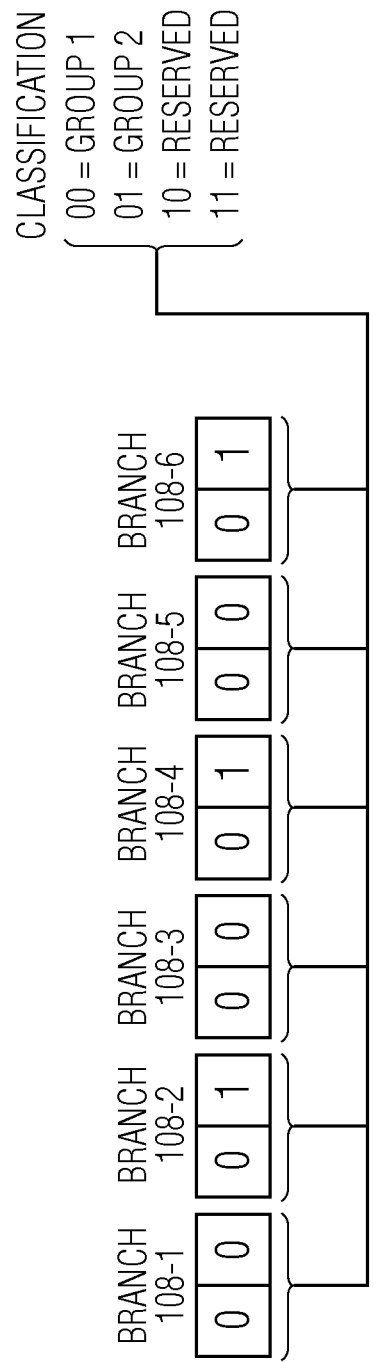

The example depicted in FIG. 7 is similar to the example depicted in FIG. 6. The difference between the slot table entry example depicted in FIG. 6 and the slot table entry example depicted in FIG. 7 is that in the example depicted in FIG. 7, the two-bit code "00" is assigned to the branches 108-1, 108-3, 108-5, representing that the branches 108-1, 108-3, 108-5 are classified into group #1. In addition, in the example depicted in FIG. 7, the two-bit code "01" is assigned to the branches 108-2, 108-4, 108-6, representing that the branches 108-2, 108-4, 108-6 are classified into group #2. For each slot table entry, twelve bits are needed to specify groups of all of the branches connected to the communications controller 104.

Compared with the source-based encoding approach and the destination-based encoding approach, a saving of six bits per slot table entry is achieved using the branch classification without sender encoding approach in the examples depicted in FIGS. 5-7. In addition, compared with the matrix-based encoding approach, a saving of eighteen bits per slot table entry is achieved using the branch classification without sender encoding approach in the examples depicted in FIGS. 5-7.

In an exemplary operation of the communications controller 104, such as the switch 304 or the CBG 404 under the branch classification without sender encoding approach, in a time slot, the communications controller 104 checks a slot table entry of the time slot to selectively block and selectively forward data received on branches 108-1, 108-2, 108-3, 108-4, 108-5, 108-6 connected to the communications controller 104. Upon receiving data from a sender communications device 102-1, 102-2, 102-3, 102-4, 102-5, 102-6, 102-7 or 102-8, the communications controller 104 checks the destination communications device 102-1, 102-2, 102-3, 102-4, 102-5, 102-6, 102-7 or 102-8 of the received data. If the sender communications device and the destination communications device are connected to branches that are classified into different groups, the communications controller blocks the received data from being delivered to the destination communications device. If the sender communications device and the destination communications device are connected to branches that are classified into the same group, the communications controller forwards the received data to the destination communications device.

In an embodiment, for each of the branches 108-1, 108-2, 108-3, 108-4, 108-5, 108-6 connected to the communications controller 104, such as the switch 304 or the CBG 404, a slot table entry specifies into which group the branch is classified and whether or not the particular branch is connected to a communications device that is allowed to send data through the communications controller 104 in the time slot of the slot table entry. For example, the slot table entry generation unit 166, 366 or 466 is configured to generate the slot table entry that, for each of the branches 108-1, 108-2, 108-3, 108-4, 108-5, 108-6 of the communications network 100 that are connected to the communications controller 104, 304 or 404, specifies into which of the at least one group a particular branch is classified and whether or not the particular branch is connected to a communications device that is allowed to send data through the communications controller in the time slot of the slot table entry. Specifying in a slot table entry the classified group for each branch and whether or not each branch is connected to a communications device that is allowed to send data through the communications controller in the time slot of the slot table entry is referred to as the branch classification with sender encoding approach.

In addition to the common benefits of the branch classification encoding approach, the branch classification with sender encoding approach also permits slot policing in which only communications devices connected to a single branch or a subset of the branches of a group are allowed to send in a particular time slot. Slot policing increases the robustness of the communications network 100, which may be a FlexRay™ network, by only allowing scheduled communications nodes to send data across the communications network through the communications controller 104. Errors in other communications devices, which can cause erroneous behavior on the communications network (e.g., a FlexRay™ network), can be blocked by using the communications controller 104 with slot policing functionality. Some examples of slot tables encoded in the branch classification with sender encoding approach are described below with respect to FIGS. 8-12.

Figure 8:
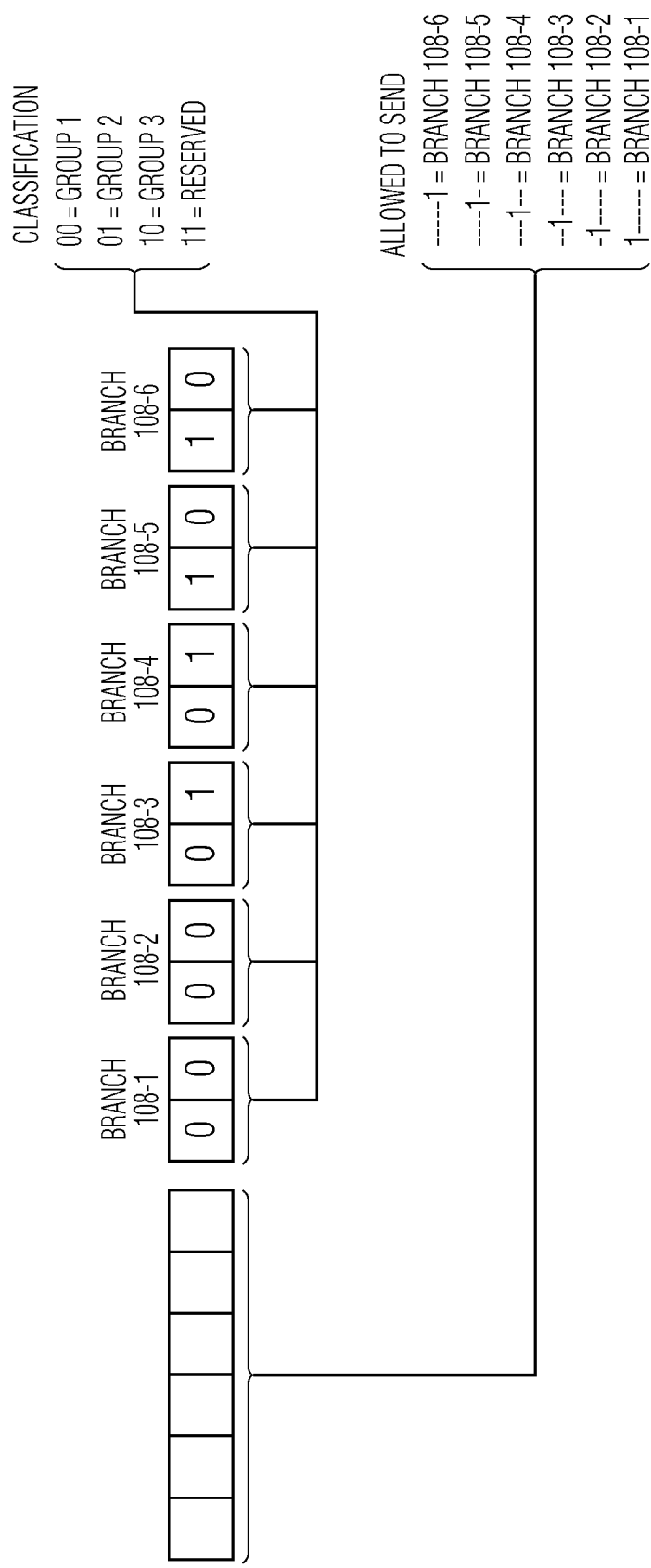

The slot table example depicted in FIG. 8 is an extension of the slot table example depicted in FIG. 5. Specifically, beside the two bits used to specify groups for the branches 108-1, 108-2, 108-3, 108-4, 108-5, 108-6 of the communications network 100, six additional bits are used to specify communications device or devices connected to which branch or branches is/are allowed to send data through the communications controller 104 in the time slot associated with the slot table entry. For each branch of the communications network, one extra bit is used to indicate whether a communications device connected to a particular branch of a group is allowed to transmit data in the time slot associated with the slot table entry. For example, if the six additional bits are "011011," communications devices connected to branches 108-2, 108-3, 108-5, 108-6 are allowed to transmit data in the time slot associated with the slot table entry. If a communications device connected to the branch 108-2 in group #1 transmits data, such as a data frame, which occupies more than the time slot associated with the slot table entry, the data can be detected and flagged as an error. In addition, if a communications device connected to the branch 108-1 in group #1 starts transmitting data in the time slot associated with the slot table entry, the data can be detected and flagged as an error. In another example, the six additional bits are "100001," which means that communications devices connected to the branches 108-1, 108-6 are allowed to transmit data in the time slot associated with the slot table entry.

Figure 9:
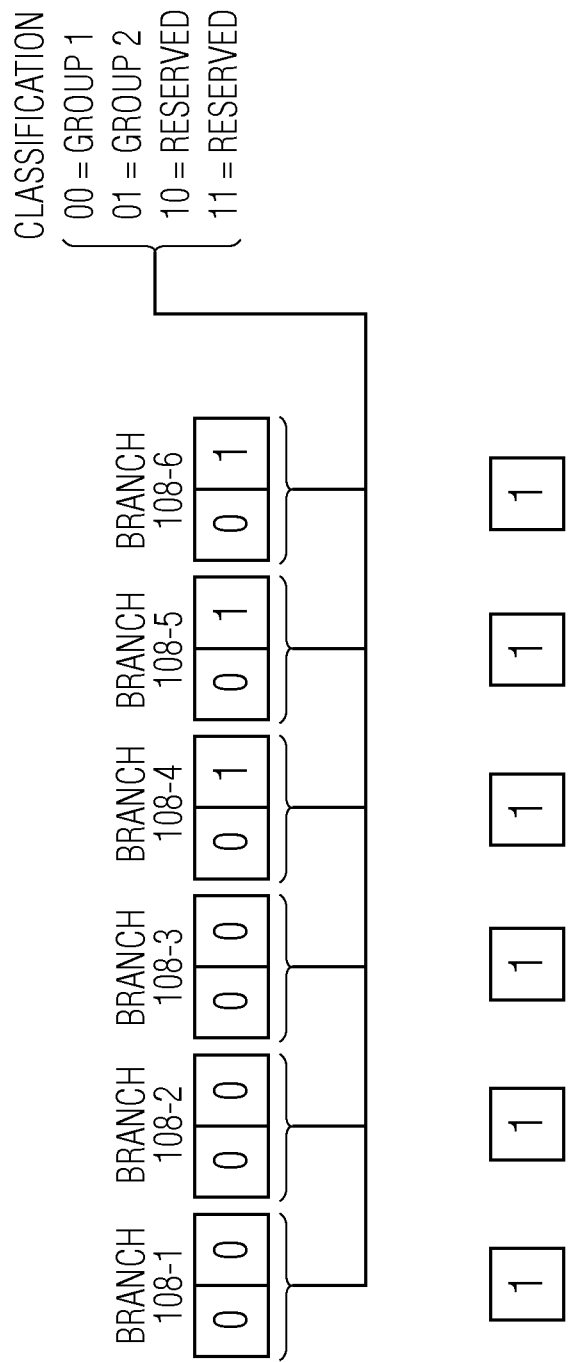

The slot table example depicted in FIG. 9 is an extension of the slot table example depicted in FIG. 6. Specifically, beside the twelve bits used to specify groups for the branches 108-1, 108-2, 108-3, 108-4, 108-5, 108-6 of the communications network 100, six additional bits are used to specify communications device or devices connected to which branch or branches is/are allowed to send data through the communications controller 104 in the time slot associated with the slot table entry. For each branch of the communications network, one extra bit is used to indicate whether a communications device connected to a particular branch of a group is allowed to transmit data in the time slot associated with the slot table entry. In the example depicted in FIG. 9, the six additional bits are "111111," which means that communications devices connected to branches 108-1, 108-2, 108-3, 108-4, 108-5, 108-6 are allowed to transmit data in the time slot associated with the slot table entry.

Figure 10:
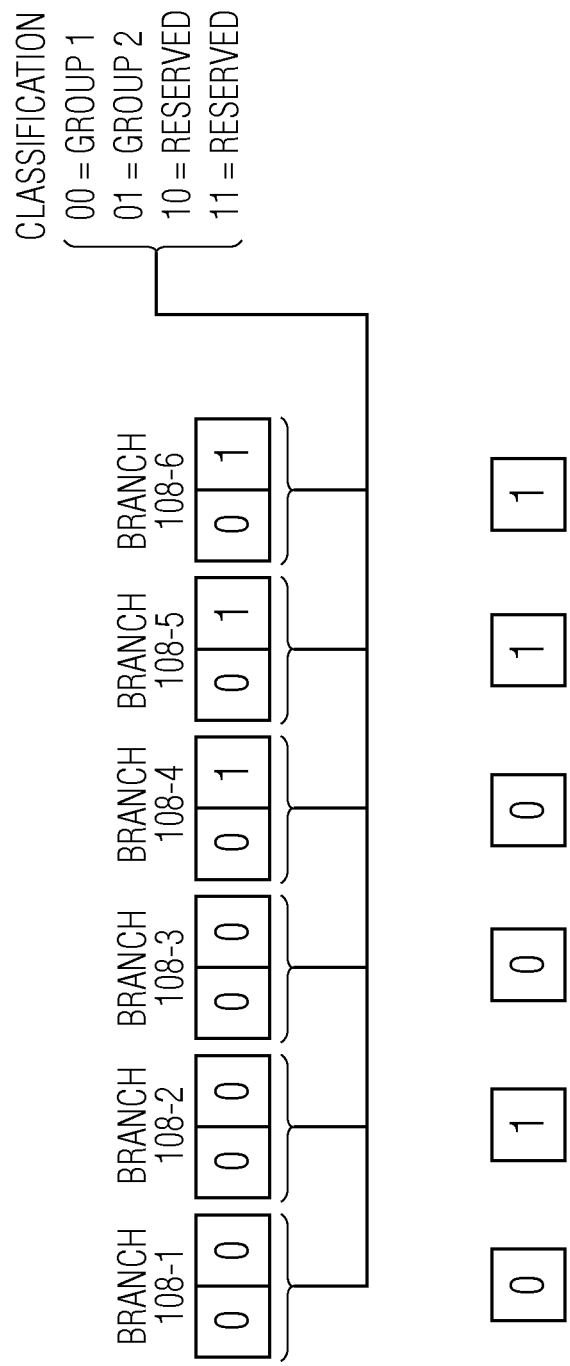

Similar to the example depicted in FIG. 9, the example depicted in FIG. 10 is an extension of the example depicted in FIG. 6. The difference between the examples depicted in FIGS. 9 and 10 is that, in the example depicted in FIG. 10, the six additional bits are "010011." In the example depicted in FIG. 10, communications devices connected to branches 108-2, 108-5, 108-6 of the communications network 100 are allowed to transmit data in the time slot associated with the slot table entry.

Figure 11:
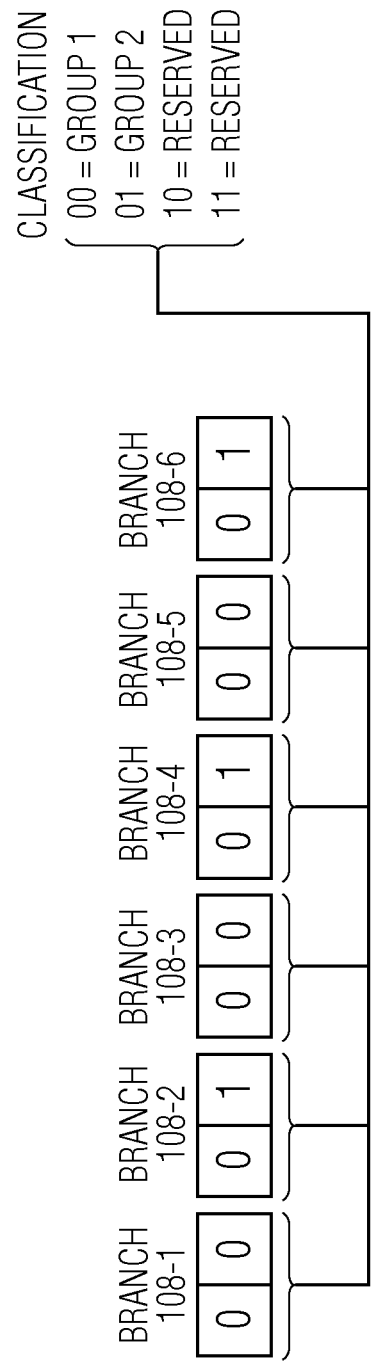

The example depicted in FIG. 11 is an extension of the example depicted in FIG. 7. Specifically, beside the twelve bits used to specify groups for the branches 108-1, 108-2, 108-3, 108-4, 108-5, 108-6 of the communications network 100, six additional bits are used to specify communications device or devices connected to which branch or branches is/are allowed to send data through the communications controller 104 in the time slot associated with the slot table entry. For each branch of the communications network, one extra bit is used to indicate whether a communications device connected to a particular branch of a group is allowed to transmit data in the time slot associated with the slot table entry. In the example depicted in FIG. 11, the six additional bits are "111111," which means that communications devices connected to branches 108-1, 108-2, 108-3, 108-4, 108-5, 108-6 are allowed to transmit data in the time slot associated with the slot table entry.

Figure 12:
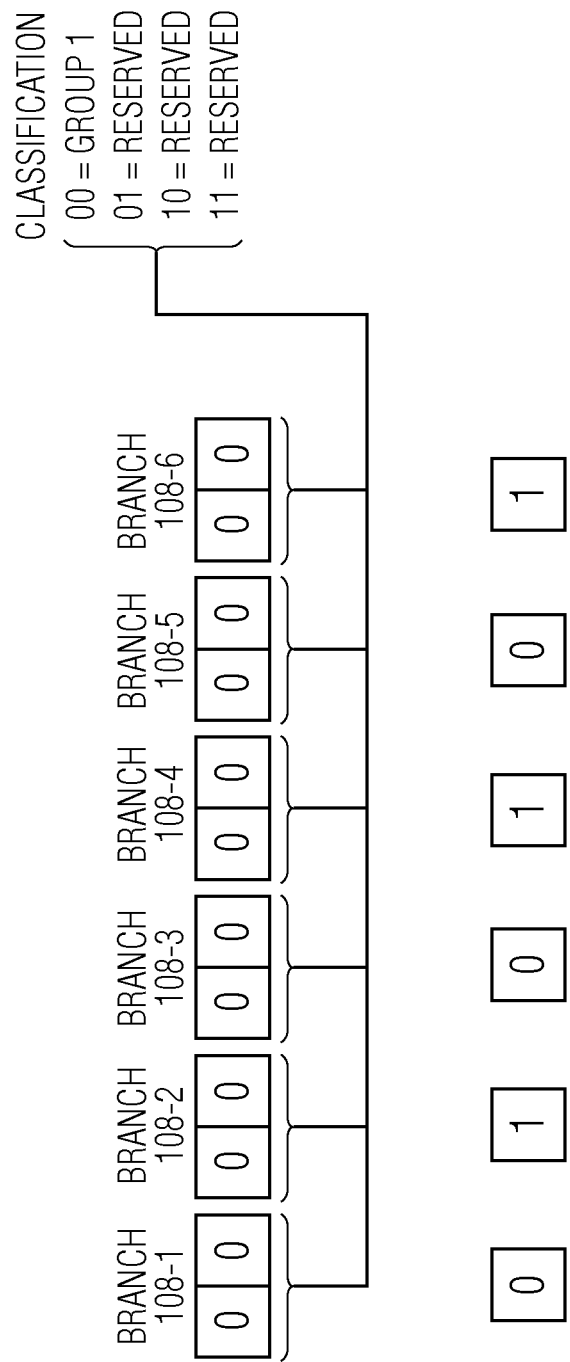

In the example depicted in FIG. 12, twelve bits are used to specify the sole group, which is group #1, for the branches 108-1, 108-2, 108-3, 108-4, 108-5, 108-6 of the communications network 100. In addition to the twelve bits, six additional bits are used to specify communications device or devices connected to which branch or branches is/are allowed to send data through the communications controller 104 in the time slot associated with the slot table entry. In the example depicted in FIG. 12, the six additional bits are "010101," which means that communications devices connected to branches 108-2, 108-4, 108-6 are allowed to transmit data in the time slot associated with the slot table entry.

Compared with the source-based encoding approach and the destination-based encoding approach, the branch classification with sender encoding approach in the examples depicted in FIGS. 8-12 use the same number of bits per slot table entry while offering more functionality. In addition, compared with the matrix-based encoding approach, a saving of twelve bits per slot table entry is achieved using the branch classification with sender encoding approach in the examples depicted in FIGS. 8-12.

In an exemplary operation of the communications controller 104, such as the switch 304 or the CBG 404 under the branch classification with sender encoding approach, in a time slot, the communications controller 104 checks a slot table entry of the time slot to selectively block and selectively forward data received on branches 108-1, 108-2, 108-3, 108-4, 108-5, 108-6 connected to the communications controller 104. Upon receiving data from a sender communications device 102-1, 102-2, 102-3, 102-4, 102-5, 102-6, 102-7 or 102-8, the communications controller 104 checks the destination communications device 102-1, 102-2, 102-3, 102-4, 102-5, 102-6, 102-7 or 102-8 of the received data. If the sender communications device and the destination communications device are connected to branches that are classified into different groups, the communications controller blocks the received data from being delivered to the destination communications device. If the sender communications device and the destination communications device are connected to branches that are classified into the same group, the communications controller further checks whether or not the sender communications device is connected to a branch that is allowed to send in the time slot according to the slot table entry. If the sender communications device is connected to a branch that is allowed to send in the time slot, the communications controller forwards the received data to the destination communications device.

FIG. 13 shows a comparison table for bits per slot table entry using source-based encoding approach, destination-based encoding approach, matrix-based encoding approach, an embodiment of the branch classification without sender encoding approach and an embodiment of the branch classification with sender encoding approach for the communications controller 104 connecting to up to eight branches. For N (N is a positive integer that is larger than 1) branches connected to the communications controller 104, at least $N \times \lceil \log^2(N) \rceil$ bits are needed to encode a slot table entry using source-based encoding approach and destination-based encoding approach. $\lceil M \rceil$, where M is a number, is the smallest integer that is larger than or equal to M. For example, $\lceil 1.25 \rceil$ is equal to 2 and $\lceil 0 \rceil$ is equal to 0. At least $N^2 - N$ bits are needed to encode a slot table entry using matrix-based encoding approach. At least $N \times \lceil \log^2(N/2) \rceil$ bits are needed to encode a slot table entry using the branch classification without sender approach (with two branches per group) because N branches can have at most N/2 groups. At least $N \times \lceil \log^2(N/2) \rceil + N$ bits are needed to encode a slot table entry using the branch classification with sender approach (with two branches per group).

The table of FIG. 13 shows that an embodiment of the branch classification without sender encoding approach requires fewer bits to encode a slot table entry as the source-based encoding approach, the destination-based encoding approach and the matrix-based encoding approach. In addition, the table of FIG. 13 shows that an embodiment of the branch classification with sender encoding approach require the same number of bits to encode a slot table entry as the source-based encoding approach, the destination-based encoding approach and the matrix-based encoding approach. Although the same number of bits are used, the embodiment of the branch classification with sender encoding approach provides more functionality using the same number of bits.

Figure 14:
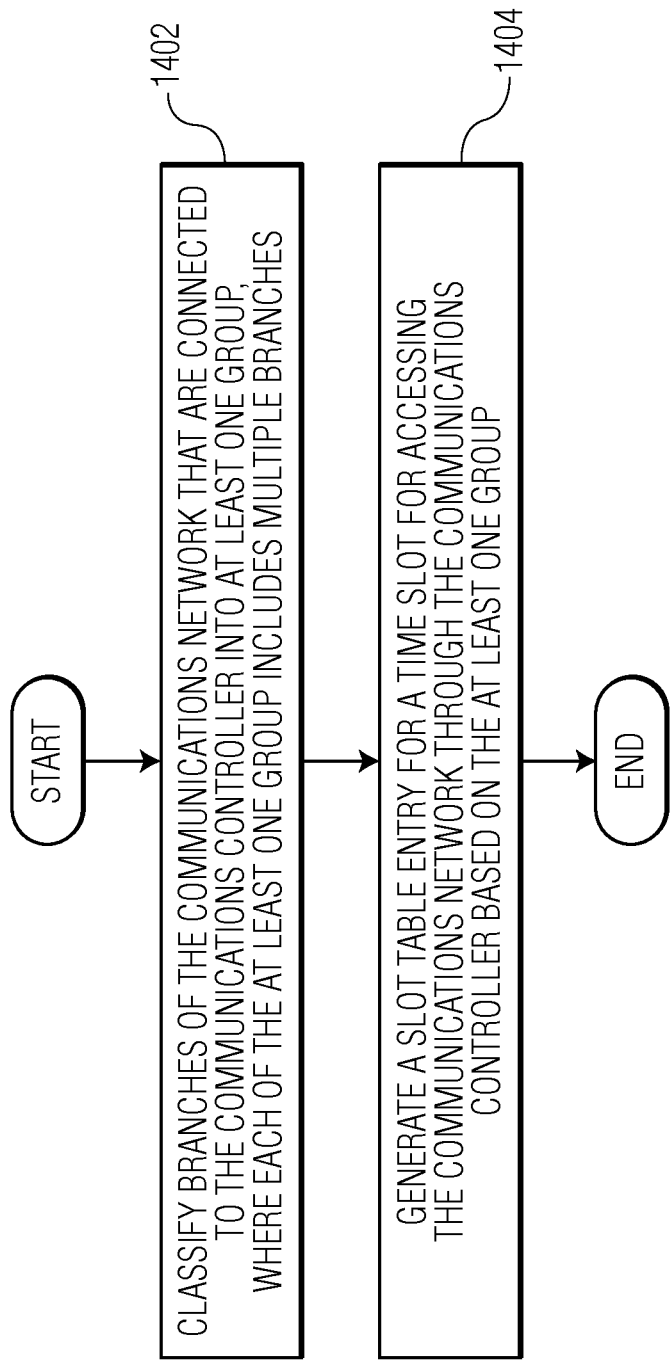
FIG. 14 is a process flow diagram of a method for encoding a slot table for a communications controller of a communications network in accordance with an embodiment of the invention.

FIG. 14 is a process flow diagram of a method for encoding a slot table for a communications controller of a communications network in accordance with an embodiment of the invention. The communications controller may be similar to or same as the communications controller 104 depicted in FIG. 1, the switch 304 depicted in FIG. 3 and the CBG 404 depicted in FIG. 4. At block 1402, branches of the communications network that are connected to the communications controller are classified into at least one group, where each of the at least one group includes multiple branches. At block 1404, a slot table entry for a time slot for accessing the communications network through the communications controller is generated based on the at least one group.

The various components or units of the embodiments that have been described or depicted (e.g., the communications controller 104, the switch 304, the CBG 404, the slot table systems 140, 340, 440, the branch classification units 164, 364, 464, the slot table entry generation units 166, 366, 466, the slot table storage units 168, 368, 468, the state machines 342, 442, the communications devices 102-1, 102-2, 102-3, 102-4, 102-5, 102-6, 102-7, 102-8) may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments (e.g., the communications controller 104, the switch 304, the CBG 404, the slot table systems 140, 340, 440, the branch classification units 164, 364, 464, the slot table entry generation units 166, 366, 466, the slot table storage units 168, 368, 468, the state machines 342, 442, the communications devices 102-1, 102-2, 102-3, 102-4, 102-5, 102-6, 102-7, 102-8) that have been described or depicted may be implemented in a processor, which may include a multifunction processor and/or an application-specific processor.

The various embodiments of the invention efficiently and effectively specify and implement slot table information for a communications controller such as a next generation FlexRay™ active star device. For example, embodiments of the invention allow a semiconductor manufacturer to either implement a lower-cost FlexRay™ device that still preserves backward compatibility with existing FlexRay™ active star devices or provide more robustness to FlexRay™ cluster by implementing an enhanced FlexRay™ device with the same memory requirements to achieve a lower-cost solution and/or a higher profit margin. In addition, embodiments of the invention can support backward compatibility with FlexRay™ Active Star devices with fewer configuration bits per slot, which leads to lower-cost devices, and provide increased robustness by allowing a confinement of errors in nodes and/or the network to individual branches and improving the robustness of the overall FlexRay™ network. Therefore, embodiments of the invention enable a next generation active star to direct and police the data communications in a FlexRay™ cluster by efficient and effective usage of the scarce memory resources.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for encoding a slot table for a communications controller of a communications network, the method comprising:
    classifying branches of the communications network that are connected to the communications controller into a plurality of groups, wherein each of the plurality of groups includes multiple branches; and
    generating a slot table entry for a time slot for accessing the communications network through the communications controller based on the plurality of groups, wherein generating the slot table entry comprises generating the slot table entry that, for each of the branches of the communications network that are connected to the communications controller, specifies into which of the plurality of groups a particular branch is classified so that the communications controller only allows communications devices connected to branches in each of the plurality of groups to communicate with each other through the communications controller in the time slot, wherein generating the slot table entry comprises generating the slot table entry that, for each of the branches of the communications network that are connected to the communications controller, specifies into which of the plurality of groups a particular branch is classified and whether or not the particular branch is connected to a communications device that is allowed to send data through the communications controller in the time slot, wherein generating the slot table entry comprises generating the slot table entry using $N \times \lceil \log^2(N/2) \rceil + N$ bits, where N is a positive integer that represents the number of the branches of the communications network that are connected to the communications controller.

2. The method of claim 1, wherein generating the slot table entry comprises generating the slot table entry that, for each of the branches of the communications network that are connected to the communications controller, only specifies into which of the plurality of groups a particular branch is classified.

3. The method of claim 2, wherein generating the slot table entry comprises generating the slot table entry using $N \times \lceil \log^2(N/2) \rceil$ bits, where N is a positive integer that represents the number of the branches of the communications network that are connected to the communications controller.

4. The method of claim 1, further comprising:
    reclassifying the branches of the communications network that are connected to the communications controller into one or more groups; and
    generating a second slot table entry for a second time slot for accessing the communications network through the communications controller based on the one or more groups.

5. The method of claim 4, wherein the one or more groups are different from the plurality of groups.

6. The method of claim 1, wherein the communications controller is a switch.

7. The method of claim 1, wherein the communications controller is a central bus guardian (CBG).

8. A system for encoding a slot table for a communications controller of a communications network, the system comprising:
    a branch classification unit configured to classify branches of the communications network that are connected to the communications controller into a plurality of groups, wherein each of the plurality of groups includes multiple branches; and
    a slot table entry generation unit configured to generate a slot table entry for a time slot for accessing the communications network through the communications controller based on the plurality of groups, wherein the slot table entry generation unit is configured to generate the slot table entry that, for each of the branches of the communications network that are connected to the communications controller, specifies into which of the plurality of groups a particular branch is classified so that the communications controller only allows communications devices connected to branches in each of the plurality of groups to communicate with each other through the communications controller in the time slot, wherein the slot table entry generation unit is configured to generate the slot table entry that, for each of the branches of the communications network that are connected to the communications controller, specifies into which of the plurality of groups a particular branch is classified and whether or not the particular branch is connected to a communications device that is allowed to send data through the communications controller in the time slot, wherein the slot table entry generation unit is configured to generate the slot table entry using $N \times \lceil \log^2(N/2) \rceil + N$ bits, where N is a positive integer that represents the number of the branches of the communications network that are connected to the communications controller.

9. The system of claim 8, wherein the slot table entry generation unit is configured to generate the slot table entry that, for each of the branches of the communications network that are connected to the communications controller, only specifies into which of the plurality of groups a particular branch is classified.

10. The system of claim 9, wherein the slot table entry generation unit is configured to generate the slot table entry using $N \times \lceil \log^2(N/2) \rceil$ bits, where N is a positive integer that represents the number of the branches of the communications network that are connected to the communications controller.

11. The system of claim 8, wherein the branch classification unit configured to classify the branches of the communications network that are connected to the communications controller into one or more groups, wherein the slot table entry generation unit is further configured to generate a second slot table entry for a second time slot for accessing the communications network through the communications controller based on the one or more groups, and wherein the one or more groups are different from the plurality of groups.

12. The system of claim 8, wherein the communications controller is a switch or a central bus guardian (CBG).

13. A method for encoding a slot table for a central bus guardian (CBG) of a communications network, the method comprising:
classifying branches of the communications network that are connected to the CBG into a plurality of groups, wherein each of the plurality of groups includes multiple branches; and
generating a slot table entry for a time slot for accessing the communications network through the CBG based on the plurality of groups, wherein generating the slot table entry comprises generating the slot table entry that, for each of the branches of the communications network that are connected to the CBG, only specifies into which of the plurality of groups a particular branch is classified, wherein generating the slot table entry comprises generating the slot table entry using $N \times \lceil \log^2(N/2) \rceil$ bits, where N is a positive integer that represents the number of the branches of the communications network that are connected to the CBG.

14. The method of claim 13, wherein generating the slot table entry comprises generating the slot table entry that, for each of the branches of the communications network that are connected to the CBG, specifies into which of the plurality of groups a particular branch is classified so that the CBG only allows communications devices connected to branches in each of the plurality of groups to communicate with each other through the CBG in the time slot.

* * * * *